United States Patent Office 3,323,865
Patented June 6, 1967

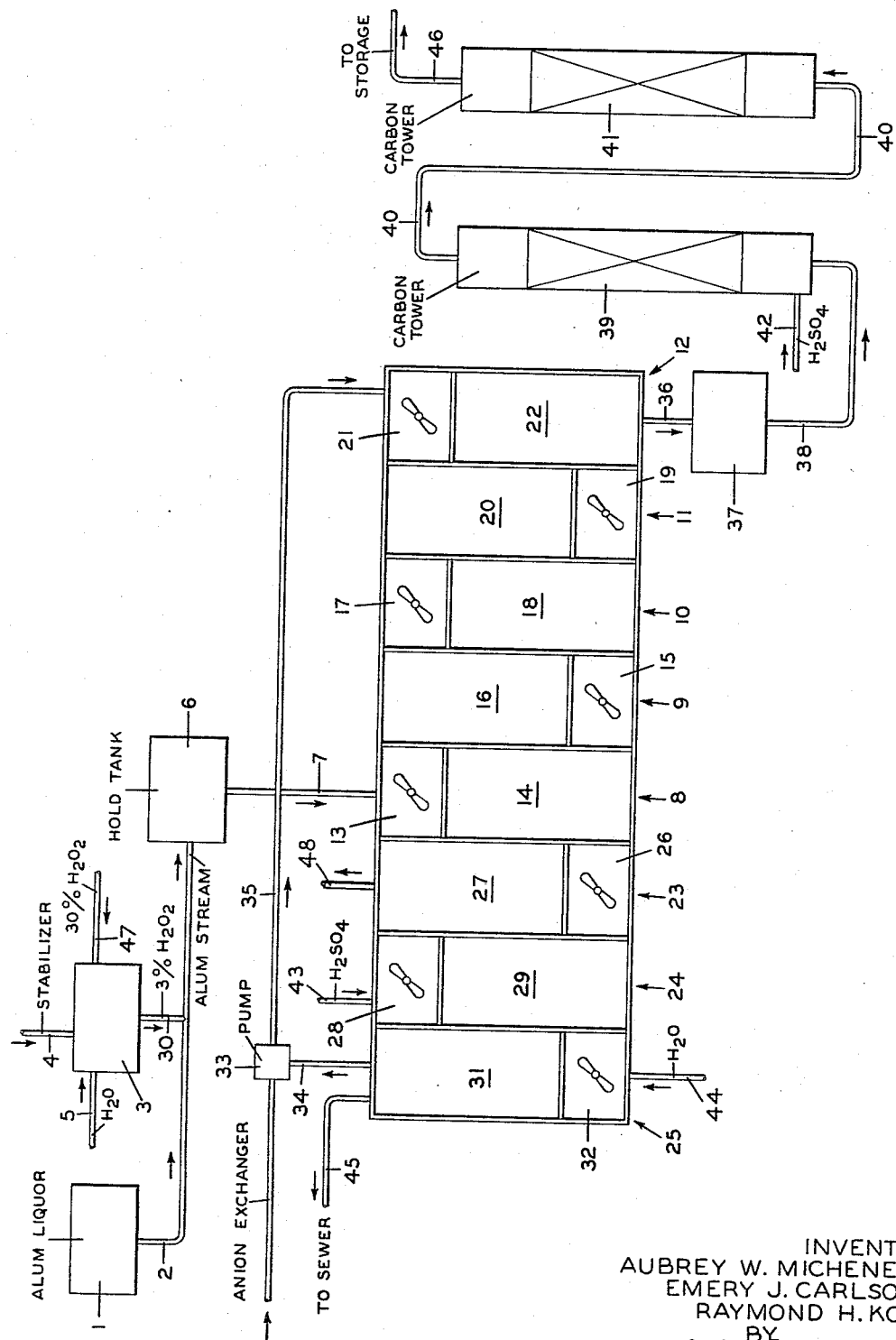

3,323,865
METHOD OF REMOVING IRON, ZIRCONIUM AND TITANIUM FROM ALUMINUM SULFATE
Aubrey W. Michener, Jr., Rockaway, Emery J. Carlson, Summit, and Raymond H. Koo, Newark, N.J., assignors to Allied Chemical Corporation, New York, N.Y., a corporation of New York
Filed Oct. 31, 1962, Ser. No. 234,463
4 Claims. (Cl. 23—123)

This invention relates to aluminum sulfate and more particularly to a process for removing metallic impurities comprising principally iron from aluminum sulfate.

Aluminum sulfate may be prepared by digesting clay with sulfuric acid. In this procedure, the alumina in the clay is converted to aluminum sulfate but unfortunately, however, other impurities consisting primarily of iron, as well as lesser amounts of titanium and zirconium which are also normally present in the clay are carried into solution with the alumina. The presence of these impurities contaminate the aluminum sulfate product and as a result the impure aluminum sulfate is rendered unsuitable for many commercial operations. Previous attempts to produce a pure aluminum sulfate product were not entirely satisfactory due to the complexity and high cost of processing the aluminum sulfate. By necessity, the trade had to resort to the use of low iron content clays, i.e., clays containing about .50 to .70% iron oxide by weight, so that the amount of iron and other impurities which enter into solution with the alumina during the digestion phase would be reduced. However, these clays are expensive and moreover, the use of these clays even in these low iron content quantities, i.e., .50 to .70% rendered the alum unsuitable for use in many commercial operations. Similarly, the use of white bauxites which can also be converted to aluminum sulfate by treatment with sulfuric acid were also not entirely suitable for many commercial operations because of the contamination of the alum product and because of the costs of processing.

A pure aluminum sulfate product can be prepared from the product of the so-called Bayer Process, i.e., a pure alumina hydrate which involves digestion of the pure alumina hydrate with sulfuric acid. Although the resultant aluminum sulfate product is free from iron impurities, nevertheless, the cost of the reagents renders the process uneconomical from a practical commercial standpoint.

An object of the present invention is to provide an efficient and economical process for the production of aluminum sulfate substantially free of metallic impurities such as iron, zirconium and titanium and other metallic impurities. Other objects and advantages will be apparent from the following description of the invention.

The most common commercial method of producing aluminum sulfate is by reaction of sulfuric acid with clay or bauxite because these materials are the cheapest and most abundant alumina containing raw materials. As is known bauxite and especially clay contain impurities particularly iron which may occur, depending upon the source, in amounts of from 0.5 to 5% or more iron calculated as $Fe_2O_3$ with of course the more impure clays being less valuable. The aluminum sulfate produced by the digestion of clay is usually in the form of an aqueous solution termed liquor containing about 6 to 9% alumina calculated as $Al_2O_3$ together with impurities including iron generally in an amount of 0.1 to 0.5% or more, titanium in an amount roughly of about .01 to 0.5% and smaller amounts of zirconium usually in an amount of less than 0.1%. While for many purposes aluminum sulfate liquor is entirely satisfactory, other operations require an iron-free aluminum sulfate, i.e., an aluminum sulfate containing less than 50 parts per million iron preferably less than 20 parts per million and desirably less than 10 parts per million. It should be remembered that aluminum sulfate is considered a relatively low cost material and consequently the removal of iron from aluminum sulfate liquor must be efficient and economical to be practical. The art has known that iron impurities could be removed from aluminum sulfate by means of a liquid anion exchanger such as an amine. In the course of our experiments we treated commercial aluminum sulfate liquor with an amine ion exchanger as taught by the art and achieved removal of iron from the liquor. Unfortunately the ion exchanger becomes rapidly used up after a few contacts with the aluminum sulfate liquor and is of no practical utility in large scale commercial operation. Attempts were made to rejuvenate or reactivate the anion exchanger as for example by treating with an alkaline solution such as sodium carbonate, sodium bicarbonate and sodium hydroxide but without success, first because there was only partial restoration of the amine efficiency and secondly because of poor separation of the organic and aqueous phases. In addition, the direct use of alkaline regenerating agent increases the free alumina content of the alum. Difficulties were also encountered with the use of nitric acid. In further tests with dilute sulfuric acid of about 2–4% concentration it was found that the anion exchanger was initially reactivated but in a very short time, i.e., after several usages with aluminum sulfate liquor, the anion exchanger lost its activity and could not be reactivated. Accordingly extensive experimentation was carried out to determine the cause of the deadening of the anion exchanger and ultimately it was discovered that other impurities in the alum liquor notably zirconium and titanium became permanently bound to the anion exchanger so that further treatment with said dilute sulfuric acid was ineffectual.

We discovered that if the anion exchanger were treated with sulfuric acid of a concentration of at least 6% preferably within the range of 10 to 15% that such treatment had the effect of loosening the bond of zirconium and titanium and reactivating the anion exchanger to its original efficiency. Further and of particular importance it was found that the anion exchanger could be reused over and over again to such an extent that one pound of anion exchanger was sufficient for treating at least two tons of alum liquor. In such an operation the cost of anion exchanger is minor and renders the process economically practical. However, we found that simple treatment with a more concentrated sulfuric acid created certain problems in the treatment of aluminum sulfate liquor namely, that the sulfate content of the anion exchanger after treatment was appreciably increased resulting in poor extraction efficiency and also rendered the alum product acid. We found that this difficulty could be overcome by reducing the sulfate content of the acid treated anion exchanger so that it contained not more than about 25% sulfate based on the weight of the anion exchanger. In brief, we found that for successful treatment of alum liquor with the anion exchanger it was necessary to reactivate the anion exchanger in a two stage operation wherein the anion exchanger is first treated with sulfuric acid of 6–30% concentration, preferably 10–15% concentration, and then the resultant anion exchanger treated to remove excess sulfate content to no more than 25% sulfate based on the anion exchanger.

In accordance with the present invention aqueous aluminum sulfate containing as impurities iron, zirconium and titanium may be treated to produce substantially iron free aluminum sulfate by (1) adding an oxidizing agent, preferably hydrogen peroxide to the aluminum sulfate liquor to convert ferrous iron in the aluminum sulfate liquor to ferric iron (2) admixing the oxidized aluminum sulfate with a water insoluble amine anion exchanger preferably in the form of a solution thereof in an organic solvent to extract the iron, titanium and zirconium impurities from the aqueous aluminum sulfate (3) separating and recovering the purified aqueous aluminum sulfate (4) reactivating the amine anion exchanger containing the impurities extracted from the aqueous aluminum sulfate by intimate contact with an aqueous solution of sulfuric acid containing about 6% to 30% sulfuric acid, preferably 10–15% sulfuric acid to remove the iron, zirconium and titanium from the amine anion exchanger (5) treating the resultant reactivated exchanger, preferably by water washing, to reduce the sulfate content to a value of no more than 25% based on the weight of amine anion exchanger, and (6) returning the thus treated activated amine for further contact with impure aluminum sulfate liquor for removal of iron impurities from the aluminum sulfate liquor.

The amine anion exchangers are well known organic materials commercially available and are amines wherein one or more of the hydrogens are substituted by a hydrocarbon radical and are further characterized in that in free base or salt form they are oil-soluble, water-insoluble and have a molecular weight generally within the range of about 200 to 600. Dilaurylamine, trilaurylamine, butyldilaurylamine and organic amine compounds as set forth by Coleman et al. in Industrial and Engineering Chemistry, Volume 50 (1958) on page 1756 may be employed according to the present process. A particularly suitable amine anion exchange is "Amberlite LA-1" which is a secondary amine in which the structural configuration consists of two highly branched aliphatic chains attached to the nitrogen atom and has a theoretical molecular weight of about 351 to 393. Although it is not necessary for practice of the invention, the amine anion exchanger is, however, preferably dissolved in an organic solvent. The solvent for the amine anion exchanger may be any normally liquid organic material in which the amine is soluble as for example petroleum distillates, aliphatic and aromatic hydrocarbons and high molecular weight alcohols. Kerosene, heavy naphtha and benzene are particularly suitable because of their ready availability and low cost. The quantity of amine anion exchanger in the organic solvent is not critical and may vary from about 2 to 30%, preferably within the range of about 3 to 15%.

The iron impurities which are present in the alum liquor, exist partly in the ferrous state and for successful practice of the present invention, these iron impurities must be converted to the ferric state. Oxidation of the ferrous ion to the ferric ion may be accomplished by the addition to the alum liquor of oxidizing agents such as sodium chlorate, potassium permanganate, ozone or hydrogen peroxide. Hydrogen peroxide is preferred because of the ease of operation and the excellent results obtained. The amount of hydrogen peroxide required for the oxidation depends upon the ferrous ion content in the liquid aluminum sulfate. If too little hydrogen peroxide is employed, there will remain in solution unconverted ferrous ion, whereas if an excess quantity of hydrogen peroxide is employed, the amine is degraded. The hydrogen peroxide employed as the oxidizing agent may be a standard commercial grade hydrogen peroxide of about 30% concentration. Effective and efficient conversion of the ferrous ion to ferric ion requires accurate delivery and flow regulation of the oxidizing agent and therefore it is desirable to dilute the hydrogen peroxide to about 3% concentration so that the volume metered into the alum stream is sufficiently large to permit a more accurate delivery and flow regulation. In order to prevent decomposition of the diluted hydrogen peroxide solution against accidental contamination, a stabilizeer may be added to the hydrogen peroxide solution. This is not necessary, however, if adequate safeguards against contamination of hyrogen peroxide are taken.

The feed of the oxidizing agent is controlled in accordance with the total amounts of ferrous ions in the liquid aluminum sulfate solution. Satisfactory oxidation of the ferrous ion content in the aluminum sulfate liquor can be obtained with positive delivery of, and close control over the aluminum sulfate and dilute hydrogen peroxide feeds to the mixing point. The oxidation rate of ferrous to ferric ion in alum is fairly rapid and quite precise with hydrogen peroxide over a temperature range of about 115° to 140° F. Since there is slow partial reversion of ferric to ferrous ion in the oxidized alum upon standing at temperatures at about 115° F., the oxidized alum should be used promptly or stored at temperatures lower than about 115° F.

After oxidation, the aluminum sulfate liquor and the amine organic solution are brought into intimate contact with sufficient agitation for proper dispersion. The extraction of the impurities from the oxidized liquid aluminum sulfate may be effected in equipment currently available for conventional liquid-liquid extraction procedures. Thus, there may be employed in the present invention, centrifugal contactors, mixer-settlers, and the variously designed pulsed and non-pulsed extraction columns. Mixer settlers are preferred, however, because of the low number of extraction and stripping stages required. Satisfactory results are obtained by employing an aqueous to organic phase ratio of 1 to 1; optimum results, however, are obtained when the aqueous to organic phase ratio is 1 to 2. Phase separation is quite rapid and merely as illustrative, at a temperature of about 115° F. and an aqueous to organic ratio of 1/25 to 2/1, the aqueous phase settles to clarity within about 10 minutes. Following the extraction of the impurities from the liquid aluminum sulfate, the organic phase containing the iron, zirconium and titanium is contacted with a second aqueous solution which contains a regenerating and rejuvenating agent that will convert the amine back to its former activity. This regeneration and rejuvenation step permits the amine to be reused repeatedly in a continuous operation. An important feature of this invention for complete regeneration and rejuvenation of the "pregnant" amine, i.e., the amine product containing the extracted iron, zirconium and titanium impurities, is the treatment with sulfuric acid having a concentration of at least 6% $H_2SO_4$, preferably 10–15% $H_2SO_4$. Treatment of the pregnant amine with a weak sulfuric acid of about 2–4% concentration was found to be ineffective for removing the zirconium and titanium impurities which are also present in the amine solution and these impurities caused the amine to lose its effectiveness as an anion exchange resin after several uses in the process. Furthermore even a more severe treatment of the pregnant amine, i.e., treatment with an alkaline solution, e.g. sodium carbonate, was found to be ineffective for completely restoring the efficiency of the amine. Moreover, new problems were created by this more severe treatment because of the resultant poor separation of organic and aqueous phases and precipitation of metallic salts. We discovered that if we subjected the pregnant amine, i.e., the amine containing the iron, zirconium and titanium impurities to treatment with sulfuric acid, of about 10–15% concentration, that both the regeneration (removal of iron impurities) and rejuvenation (removal of zirconium and titanium impurities) of the amine are accomplished and no complications arise in the separation of the organic and aqueous phases. The use of $H_2SO_4$ at concentrations above 30%, although operable, is less desirable because it increases the amine loss and tends to form a third interfacial layer. The quantity of sulfuric acid required to reactivate in terms of 100% $H_2SO_4$ is relatively small and of the order of about ¼ to ½ pound $H_2SO_4$ per pound of amine anion exchange resin. The temperature at which the reactivation takes place depends upon the concentrations of the amine sulfate in the organic solution and the $H_2SO_4$ used in the treatment. As illustrative, the pregnant amine solution containing mainly iron, zirconium and titanium, extracted from the liquid aluminum sulfate is intimately contacted with about a 15% sulfuric acid solution at a temperature of about 90° F. to 130° F. and a phase ratio of aqueous to organic of about 1/6–1/12. The mixture is vigorously agitated for approximately 5 to 7 minutes and the mixture is then allowed to settle. The use of 10–15% sulfuric acid was found to be the most practical method of revitalizing the amine by decreasing the level of all impurities to less than the allowable maximum. This is advantageous because the regenerated amine may then be subsequently used in a sulfate system, the sulfuric acid fully restores the amine activity in a single operation, it gives better settling characteristics than other acids and alkaline solutions which tend to form a third interfacial layer, and finally amine losses are minimized. The resultant reactivated amine containing organic solution after contact with the sulfuric acid contains an appreciable amount of excess sulfate content. Originally this reactivated organic solution containing the excess sulfate content was employed to treat aluminum sulfate containing impurities for removal of the metallic impurities. However, it was found that the presence of the excess sulfate impaired the extraction efficiency and also had the effect of altering the aluminum sulfate product from basic aluminum sulfate to acid aluminum sulfate. To overcome these difficulties it was found important to remove in large measure the excess sulfate content so that the amine organic solution contained not more than 25% of sulfate based on the weight of the amine exchanger. A simple and convenient method is to water wash the amine in the organic solvent to effect removal of the excess sulfate. The amount of water should, of course, be sufficient to reduce the sulfate content to the desired minimum. A convenient practical procedure is to contact the anion exchanger with water in such proportion that the acidity in the aqueous phase is within the range of about 0.5–1.0% $H_2SO_4$. When employing the above regeneration and rejuvenation procedure we have found that the activity of the amine exchange resin can be maintained after purifying approximately five thousand pounds of aluminum sulfate liquor per pound of amine anion exchange resin.

The accompanying drawing is a diagrammatic flow sheet illustrating the process of the present invention.

The aluminum sulfate liquor charge from the digestion of clay or bauxite containing about 8.3% $Al_2O_3$, .15% $Fe_2O_3$, .01% $ZiO_2$, and .01% $TiO_2$ leaves tank 1 and is admixed in line 2 with hydrogen peroxide leaving tank 3 through line 30. The hydrogen peroxide employed entering tank 3 through line 47 is a standard commercial grade hydrogen peroxide of about 30% concentration, which is diluted to about 3% prior to its use in the process. Water as the diluent may be added to tank 3 through line 5. If necessary, a stabilizer may be added to tank 3 through line 4.

The aluminum sulfate stream containing the dilute hydrogen peroxide enters hold tank 6 where the partially oxidized aluminum sulfate liquor is held until completion of the oxidation. At this point the amount of ferrous ion remaining in the aluminum sulfate liquor may be determined, and if necessary, additional amount of hydrogen peroxide or aluminum sulfate liquor may be admitted into hold tank 6. The oxidation rate of ferrous to ferric ion in the aluminum sulfate liquor is fairly rapid over a temperature range of about 115° F. to 140° F. As an illustration, when the total iron content in the aluminum sulfate liquor is about 1600 parts per million, the ferrous ion in the aluminum sulfate liquor can be oxidized to about 12 parts per million residual ferrous ion in a matter of minutes but further oxidation to less than about 5 parts per million ferrous ion requires about 10 to 15 minutes. The oxidation temperature may be maintained within the range of 115° to 140° F. by any conventional procedure such as by provision of a jacket surrounding the tank through which a heating or cooling medium flows. When the desired degree of ferrous to ferric ion conversion is obtained, the oxidized aluminum sulfate liquor is discharged from hold tank 6 through line 7 and enters the first mixer settler 8 of an extraction train comprising 5 mixer settler units 8, 9, 10, 11 and 12 respectively. These mixer settlers are conventional in the art and comprise mixer sections 13, 15, 17, 19 and 21 respectively, adjacent to respective settler sections 14, 16, 18, 20 and 22. Each mixer settler may be provided with agitating means such as a turbine type agitator. Adjacent each mixer section is a weir section not shown which controls the liquid level in each mixer or settler, the appropriate liquid level for operation being determined by the capacity of the mixer settlers. The design of the extraction train permits the organic phase containing the liquid amine to pursue a path opposite the aqueous phase containing the oxidized aluminum sulfate in a manner conventional in the art. The first mixer settler 8 is adjacent to and communicates with a regeneration and rejuvenation train comprising three mixer settlers 23, 24, and 25 respectively. These mixer settlers are of similar construction as the mixer settlers of the extraction train and comprise mixer sections 26, 28 and 32 and settler sections 27, 29 and 31 respectively.

Amine anion exchanger such as "Amberlite LA–1" dissolved in kerosene is introduced into the mixer section 21 of mixer settler 12 as a 5% by weight solution. Initially the organic "Amberlite LA–1" may be introduced through line 35 by means of pump 33, but in continuous operation, the regenerated and rejuvenated "Amberlite LA–1" charge is recycled from mixer settler 25 through line 34, pump 33 and line 35 and introduced into mixer settler 12, and flows countercurrent to the oxidized aluminum sulfate in the extraction train. In the mixer-settlers 8, 9, 10, 11 and 12, the aqueous liquid aluminum sulfate and organic kerosene fractions are intimately contacted in the agitated mixer sections 13, 15, 17, 19 and 21 and then permitted to separate into distinct phases in their respective settler sections 14, 16, 18, 20 and 22. The individual components flow by gravity and are lifted by pump agitator action to an adjacent mixer. A peripheral speed of about 500–800 feet per minute for the agitators is sufficient for this purpose. In each mixing section of the extraction train the aqueous to organic phase ratio is maintained at about a rato of 1 to 2. At this aqueous to organic ratio there is produced an aluminum sulfate liquor containing less than about 20 parts, usually less than 10 parts per million ferric oxide in the last mixer-section 21 as compared to the aluminum sulfate liquor which originally contained about 1600 parts per million ferric oxide prior to introduction into mixer-section 13. At a temperature of about 100°–115° F., and an aqueous to organic phase ratio of 1/25 to 3/1 the aqueous phase settles to clarity within about 10 minutes. Optimum results are obtained when the aqueous to organic phase ratio is about 1/2.

The iron-free aluminum sulfate solution flows by gravity through line 36 to the crude product hold tank 37. The iron-free aluminum sulfate solution leaves hold tank 37 through line 38 and is passed through 2 conventional stripping towers 39 and 41 connected in series and which are packed with stripping agents such as activated granular carbon. In this operation the last traces of kerosene odor are removed. Since the granular carbon may contain trace amounts of iron, it may be necessary to wash the carbon bed with a strippng agent such as a 5% solution of sulfuric acid, to strip out the iron prior to using the material in treatment of the product. This treatment is advantageous because it prevents iron contamination of the product. Provision is made for the introduction of about 5% $H_2SO_4$ by means of line 42. The aluminum sulfate product leaves the first tower 39 through line 40, and enters the second tower 41. The product free from the metallic impurities iron, zirconium and titanium is discharged from tower 41 through line 46 and sent to storage.

The pregnant amine in the organic diluent overflows from settling tank 14 and enters the mixer-section 26 of mixer-settler 23. At this point, the liquid amine contains substantially all the impurities extracted from the liquid aluminum sulfate. Regeneraton and rejuvenation of the liquid amine for use in the next cycle is accomplished by treating the amine with sulfuric acid of 10–15% concentration. The sulfuric acid is introduced through line 43 to the mixer-section 28 of mixer-settler 24 and flows counter-currently with the pregnant amine solution at a phase ratio in the mixer-section of about 1:8. Wash water is added to the mixer-section 32, of mixer-settler 25 through line 44. The temperature during contact has no significant effect on the removal of iron from the pregnant amine, but for best settling characteristics of the organic and aqueous phases a temperature of about 80–150° F. is preferred. The purified amine anion exchanger solution overflows from the second settler 29 of the regeneration system into the mixer-section 32 of mixer-settler 25 where the organic solution is contacted with water entering line 44 in such proporton that the acidity of the aqueous phase is maintained at about 0.5 to 1.0% $H_2SO_4$. The aqueous affluent is maintained at about 0.5 to 1% $H_2SO_4$ so that the sulfate content in the ion exchanger is 45–50 gms. sulfate per gram equivalent, or about 12% based on the weight of the amine. The organic phase from the wash cycle leaves the settler-section 31 of mixer-settler 25 and may then be recirculated to extraction mixer settler 12 through lines 34 and 35 to continue the process. The spent sulfuric acid is discharged from the settler-section 27 of mixer-settler 23 through line 48 and the weak acid leaving the settler-section 31 is discarded or sewered through line 45.

The following example illustrates the present invention.

*Example I*

Liquid aluminum sulfate from the sulfuric acid digestion of bauxite containing about 1600 p.p.m. of total iron partly in the ferrous state together with other impurities such as zirconium and titanium was oxidized by treatment with hydrogen peroxide. The hydrogen peroxide used was of 30% concentration hydrogen peroxide which was diluted to about a 3% concentration prior to admixture which was diluted to about a 3% concentration prior to admixture with the liquid aluminum sulfate. The feed and control of the liquid aluminum sulfate and dilute hydrogen peroxide stream to the mixing point was regulated until substantially all the ferrous ion was converted to the ferric iron. The oxidized liquid aluminum sulfate was then introduced into the kerosene solution of the sulfate salt of the liquid amine resin "Amberlite LA–1" for about a half hour. The intimate contact of the liquid amine resin and the oxidized aluminum sulfate was effected by passing the oxidized aluminum sulfate liquor continuously and countercurrently to the liquid amine solution in a multi-stage mixer-settler system at a temperature of about 110° F. The constituents were contacted at a phase ratio of aqueous to organic of about 1 to 2, and were retained in the mixer-sections for about 15 minutes. Settler retention time was about 30 minutes. At a mixer agitation or peripheral speed of about 500 to 800 feet per minute, the total amount of ferric ion in the aluminum sulfate liquor was reduced as indicated below:

| Stage No.: | P.p.m. $Fe_2O_3$ in aluminum sulfate |
|---|---|
| 0 | 1600 |
| 1 | 325 |
| 2 | 63 |
| 3 | 20 |
| 4 | 9 |
| 5 | 3 |

The substantially pure aluminum sulfate product was then passed through a carbon packed tower and the last traces of kerosene odor were removed. The aluminum sulfate leaving the carbon tower was then filtered and an aluminum sulfate product substantially free from iron zirconium and other impurities was recovered. The pregnant amine from the mixer-settlers which contained the impurities extracted from the aluminum sulfate liquor was introduced into the mixer-section of one of three mixer settlers arranged in series and was contacted with a 15% sulfuric acid solution at a phase ratio of about 1:8 and at a temperature of 110° F. The purified "Amberlite LA–1" from the second settler overflowed into the mixer-section of the third mixer-settler where it was contacted with water. After this water washing in which the aqueous phase contained about 0.5% sulfuric, the "Amberlite LA–1" was restored to its original sulfate salt form and reused in the cycle.

Although certain preferred embodiments of the invention have been disclosed for purposes of illustration, it will be evident that various changes and modifications may be made therein without departing from the scope and spirit of the invention.

We claim:
1. A process for the purification of aqueous aluminum sulfate containing as impurities iron, titanium and zirconium to produce substantially iron free aluminum sulfate which comprises (1) adding an oxidizing agent to the impure aqueous aluminum sulfate at a temperature of 115 to 140° F. to convert ferrous iron in the aqueous aluminum sulfate to ferric iron (2) admixing the oxidized aqueous aluminum sulfate with a water-insoluble amine anion exchanger to extract the iron, titanium and zirconium impurities from the aqueous aluminum sulfate (3) separating and recovering the purified aqueous aluminum sulfate (4) reactivating the amine anion exchanger containing the impurities extracted from the aqueous aluminum sulfate by intimate contact with an aqueous solution of sulfuric acid having a concentration of from 6% to 30% $H_2SO_4$ at a temperature of 90 to 130° F. to remove the iron, zirconium and titanium from the amine anion exchanger (5) treating the resultant reactivated exchanger to reduce the sulfate content to a value of less than 25% sulfate based on the weight of amine anion exchanger and (6) returning the thus treated activated amine for further contact with impure aqueous aluminum sulfate for removal of iron impurities from the aqueous aluminum sulfate.

2. A process for the purification of aqueous aluminum sulfate containing as impurities iron and titanium to produce substantially iron free aluminum sulfate which comprises (1) adding hydrogen peroxide to the aqueous aluminum sulfate at a temperature of 115 to 140° F. to convert ferrous iron in the aqueous aluminum sulfate to ferric iron (2) admixing the oxidized aqueous aluminum sulfate with a solution of an oil-soluble, water-soluble amine anion exchanger dissolved in an organic solvent to extract the iron and titanium impurities from the aqueous aluminum sulfate (3) separating and recovering the purified aqueous aluminum sulfate (4) reactivating the solution of amine anion exchanger dissolved in organic solvent containing the impurities extracted from the aqueous aluminum sulfate by intimate contact with an aqueous solution of sulfuric acid having a concentration of from about 10%–15% $H_2SO_4$ at a temperature of 90 to 130° F. to remove the iron and titanium from the organic solution containing the amine anion exchanger (5) reducing the acidity of the resultant reactivated organic solution by washing with water in such proportion that the acidity in the aqueous phase is within the range of about 0.5–1% $H_2SO_4$ and (6) returning the thus treated activated amine solution for further contact with impure aqueous aluminum sulfate for removal of iron impurities from the aqueous aluminum sulfate.

3. A process for the purification of aqueous aluminum sulfate containing as impurities iron and zirconium to produce substantially iron free aluminum sulfate which comprises (1) adding hydrogen peroxide to the aqueous aluminum sulfate at a temperature of 115 to 140° F. to convert ferrous iron in the aqueous aluminum sulfate to ferric iron (2) admixing the oxidized aqueous aluminum sulfate with a solution of an oil-soluble, water-insoluble amine anion exchanger dissolved in an organic solvent to extract the iron and zirconium impurities from the aqueous aluminum sulfate (3) separating and recovering the purified aqueous aluminum sulfate (4) reactivating the solution of amine anion exchanger dissolved in organic solvent containing the impurities extracted from the aqueous aluminum sulfate by intimate contact with an aqueous solution of sulfuric acid having a concentration of from 10% to 15% $H_2SO_4$ at a temperature of 90 to 130° F. to remove the iron and zirconium from the organic solution containing the amine anion exchanger (5) reducing the acidity of the resultant reactivated organic solution by washing with water in such proportion that the acidity in the aqueous phase is within the range of about 0.5–1% $H_2SO_4$ and (6) returning the thus treated activated amine solution for further contact with impure aqueous aluminum sulfate for removal of iron impurities from the aqueous aluminum sulfate.

4. In a process for the treatment of aqueous aluminum sulfate containing iron and at least one of titanium and zirconium as impurities with a solution of an oil-soluble, water-insoluble amine anion exchanger dissolved in an organic solvent to extract ferric iron from the aqueous aluminum sulfate, the improvement which comprises reactivating the solution of amine anion exchanger dissolved in organic solvent containing the impurities extracted from the aqueous aluminum sulfate by intimate contact with an aqueous solution of sulfuric acid having a concentration of about 10–15% sulfuric acid to remove the impurities from the organic solution containing the amine anion exchanger and reducing the acidity of the resultant reactivated organic solution by washing with water in such proportion that the acidity in the aqueous phase is within the range of about 0.5–1% $H_2SO_4$ at a temperature of 90 to 130° F.

References Cited
UNITED STATES PATENTS

| | | | |
|---|---|---|---|
| 2,372,233 | 3/1945 | Thurston | 23—50 |
| 2,954,276 | 9/1960 | Hazen | 210—38 X |
| 3,078,146 | 2/1963 | Savage | 23—123 |
| 3,082,062 | 3/1963 | Preuss | 210—38 X |

OTHER REFERENCES

Thomas et al., "The Development of the Alum-Amine Process for the Recovery of Alumina From Shale," The Canadian Journal of Chemical Engineering, volume 38, No. 6, pages 220–222, Dec. 1, 1960.

OSCAR R. VERTIZ, *Primary Examiner.*

MAURICE A. BRINDISI, *Examiner.*

E. THOMAS, *Assistant Examiner.*

UNITED STATES PATENT OFFICE
CERTIFICATE OF CORRECTION

Patent No. 3,323,865                                        June 6, 1967

Aubrey W. Michener Jr., et al.

It is hereby certified that error appears in the above numbered patent requiring correction and that the said Letters Patent should read as corrected below.

Column 3, line 74, for "stabilizeer" read -- stabilizer --; column 7, lines 47 and 48, strike out "which was diluted to about a 3% concentration prior to admixture"; column 8, line 56, for "water-soluble" read -- water-insoluble --.

Signed and sealed this 24th day of September 1968.

(SEAL)
Attest:

Edward M. Fletcher, Jr.                                    EDWARD J. BRENNER
Attesting Officer                                             Commissioner of Patents